United States Patent
Yang et al.

(10) Patent No.: US 12,326,397 B2
(45) Date of Patent: Jun. 10, 2025

(54) IN-SITU APPARATUS FOR DETECTING ABNORMALITY IN PROCESS TUBE

(71) Applicant: Taiwan Semiconductor Manufacturing Co., Ltd., Hsinchu (TW)

(72) Inventors: Yu-Jen Yang, Hsinchu (TW); Chung-Pin Chou, Hsinchu (TW); Kai-Lin Chuang, Hsinchu (TW); Yan-Cheng Chen, Hsinchu (TW); Sheng-Ching Kao, Hsinchu (TW); Jun-Xiu Liu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 17/461,715

(22) Filed: Aug. 30, 2021

(65) Prior Publication Data
US 2023/0060183 A1    Mar. 2, 2023

(51) Int. Cl.
*G01N 21/05* (2006.01)
*G01F 1/663* (2022.01)
(Continued)

(52) U.S. Cl.
CPC .............. *G01N 21/05* (2013.01); *G01F 1/663* (2013.01); *G01N 15/0211* (2013.01);
(Continued)

(58) Field of Classification Search
CPC .............. G01N 21/05; G01N 15/0211; G01N 21/9501; G01N 2021/054; G01N 2291/017
See application file for complete search history.

(56) References Cited

U.S. PATENT DOCUMENTS 10,126,229 B2 * 11/2018 Nagai .................... G01N 21/05
10,520,422 B2 * 12/2019 Chiu .................. G01N 15/1434
(Continued)

OTHER PUBLICATIONS

R.F. Mudde, U.S. Groen, H.E.A. Van Den Akker, Application of LDA to bubbly flows, Nuclear Engineering and Design, vol. 184, Issues 2-3, 1998, pp. 329-338, ISSN 0029-5493, (https://www.sciencedirect.com/science/article/pii/S0029549398002064).*

(Continued)

*Primary Examiner* — Rebecca C Bryant
(74) *Attorney, Agent, or Firm* — Seed IP Law Group LLP

(57) ABSTRACT

A process tube device can detect the presence of any external materials that may reside within a fluid flowing in the tube. The process tube device detects the external materials in-situ which obviates the need for a separate inspection device to inspect the surface of a wafer after applying fluid on the surface of the wafer. The process tube device utilizes at least two methods of detecting the presence of external materials. The first is the direct measurement method in which a light detecting sensor is used. The second is the indirect measurement method in which a sensor utilizing the principles of Doppler shift is used. Here, contrary to the first method that at least partially used reflected or refracted light, the second method uses a Doppler shift sensor to detect the presence of the external material by measuring the velocity of the fluid flowing in the tube.

20 Claims, 10 Drawing Sheets

(51) Int. Cl.
    *G01N 15/0205*     (2024.01)
    *G01N 15/14*        (2024.01)
    *G01N 21/95*        (2006.01)
    *G01N 15/10*        (2006.01)

(52) U.S. Cl.
    CPC . *G01N 21/9501* (2013.01); *G01N 2015/1027* (2024.01); *G01N 2021/054* (2013.01)

(56) References Cited

U.S. PATENT DOCUMENTS

| | | | |
|---|---|---|---|
| 10,620,105 B2* | 4/2020 | Trainer | G01N 15/1459 |
| 11,193,877 B2* | 12/2021 | Potenza | G01N 15/0211 |
| 2014/0240701 A1* | 8/2014 | Wynn | G01N 21/05 |
| | | | 356/246 |

OTHER PUBLICATIONS

Stern, Liron & Bakal, Avi & Tzur, Mor & Veinguer, Maya & Mazurski, Noa & Cohen, Nadav & Levy, Uriel. (2014). Doppler-Based Flow Rate Sensing in Microfluidic Channels. Sensors (Basel, Switzerland). 14. 16799-16807. 10.3390/s140916799.*

* cited by examiner

Normal Speed

Increase in Speed

Abnormal Speed

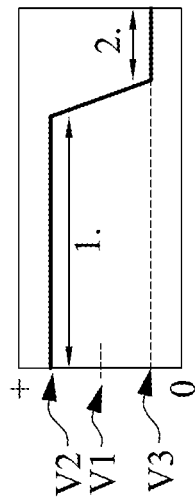
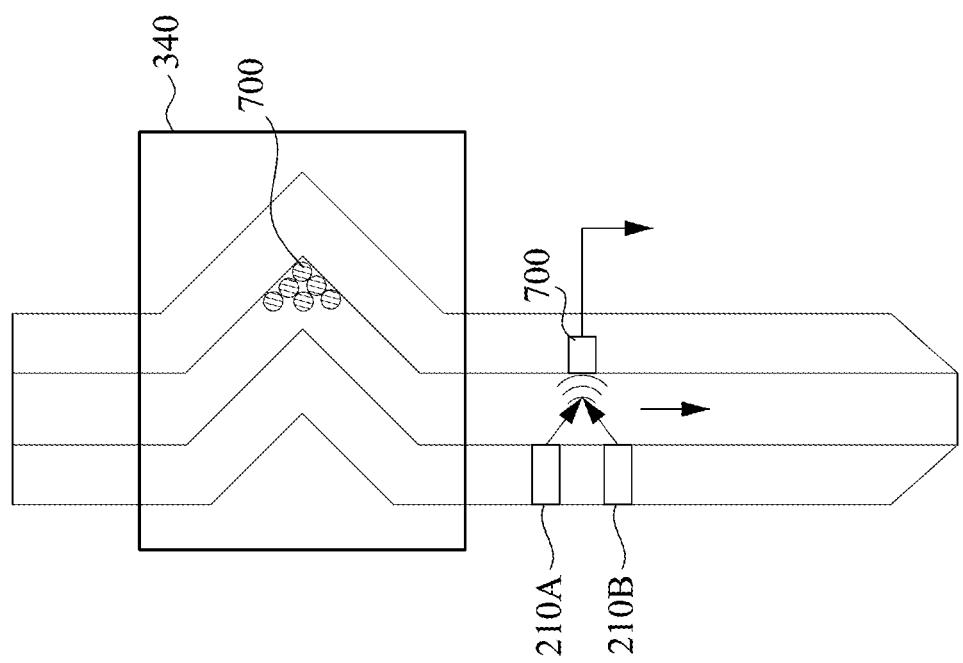

IN-SITU APPARATUS FOR DETECTING ABNORMALITY IN PROCESS TUBE

BACKGROUND

Semiconductor manufacturing processes involve various processes including applying fluid from a fluid transferring tubular device onto the surfaces of a substrate (e.g., silicon wafer) to process the surfaces of the substrate suitable for subsequent manufacturing processes. In these fluid transferring tubular devices, the fluid may often include air, voids, bubbles, particles, debris, or any other impurities which may impact the quality of the substrate itself as well as the subsequent semiconductor manufacturing processes.

The abnormality in the fluid (e.g., whether the fluid included at least one of impurities including air, voids, bubbles, particles, debris or not) transferred through the tube was difficult to detect and thus the effect of such abnormalities were not detected until the processed substrates were inspected by a separate defect inspection tool. The defect inspection process itself took significant amounts of time to perform as the entire surface of the substrate and any components mounted on the substrate had to be inspected using the defect inspection tool. In addition, such substrate defect inspection occurred after processing of the substrate was completed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7A is an arm portion of a process tube device according to another embodiment.

FIG. 7B is a graph showing a change in a pattern of a fluid velocity when there are deposited particles in the tube.

DETAILED DESCRIPTION

Figure 1B:
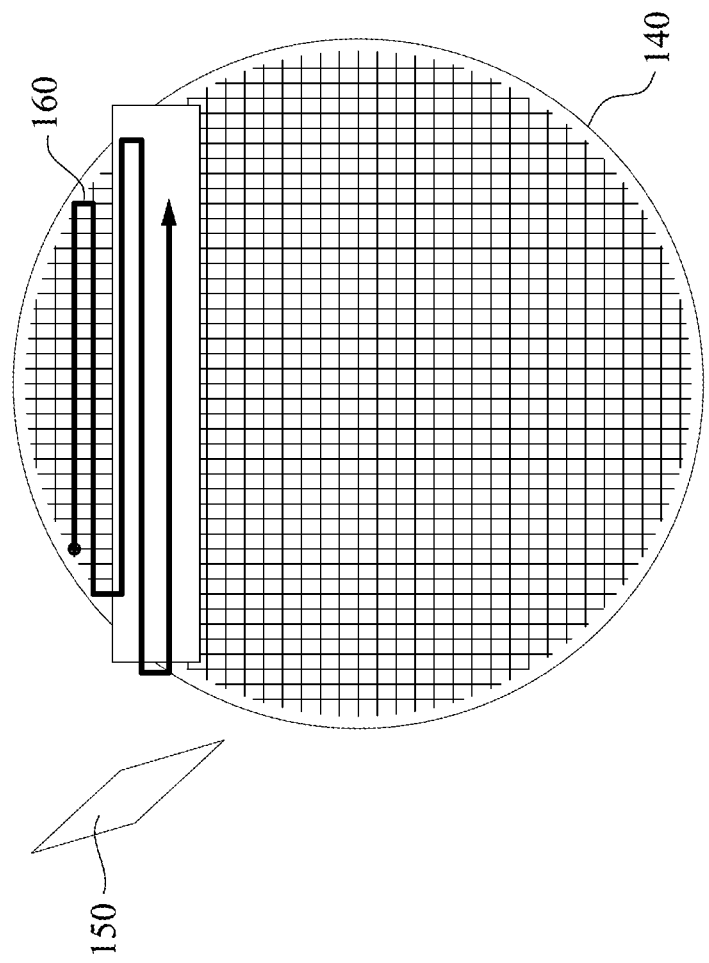
FIG. 1B illustrates a defect inspection tool inspecting a substrate in the related art.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1A:
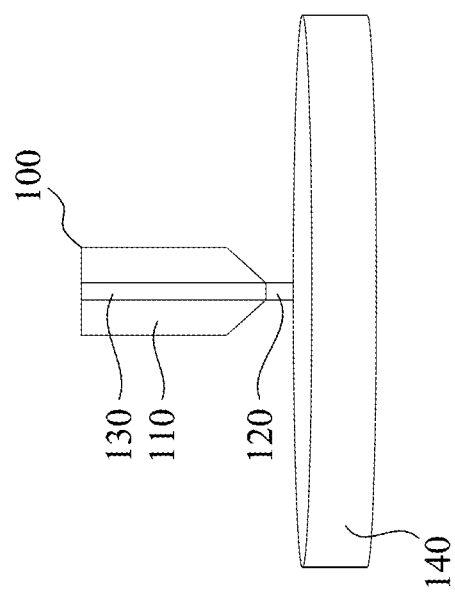
FIG. 1A is a process tube device used in a semiconductor manufacturing process in accordance with some embodiments.

FIG. 1A is a process tube device used in a semiconductor manufacturing process in accordance with some embodiments. FIG. 1A shows a portion of the process tube device 100. A nozzle 110 is configured to deliver various fluid 120 required during the semiconductor manufacturing process through a tube 130. The nozzle 110 may be connected to a tank (not shown) including the fluid 120. The fluid 120, for example, may include any cleaning fluid (e.g., deionized water DIW) or any other processing fluid required for each semiconductor manufacturing process. The fluid 120 is applied on the surfaces of a substrate 140 (e.g., silicon wafer). In some instances, the fluid being transferred within the tube may include air, voids, bubbles, particles, debris, or any other impurities which result in defects in the structures formed in or on the substrate itself as well as the subsequent semiconductor manufacturing processes (hereinafter referred to as "the impurity defect"). Because the abnormality in the fluid (e.g., whether the fluid included at least one of impurities including air, voids, bubbles, particles, debris or not) transferred through the tube was difficult to detect, the impurity defects are detected using a separate defect inspection tool 150 as shown in FIG. 1B. FIG. 1B illustrates a defect inspection tool 150 inspecting a substrate in the related art. One or more embodiments of the present disclosure obviates the need for using a separate defect inspection tool 150 which will be detailed below. As shown in FIG. 1B, according to this described defect inspection process, the process itself requires a significant amount of time to perform as the entire surface of the substrate and any components mounted on the substrate must be inspected using the defect inspection tool 150 along a direction 160 (e.g., a zig-zag direction). The shortcoming of this approach is not only the length of time needed to inspect the entire surface of the substrate 140 but also the inability to quantitatively and continuously detect an abnormality in a process tube, e.g., including bubble defects, in situ, and continuously record quantitative information regarding such abnormalities in real time.

Figure 2B:
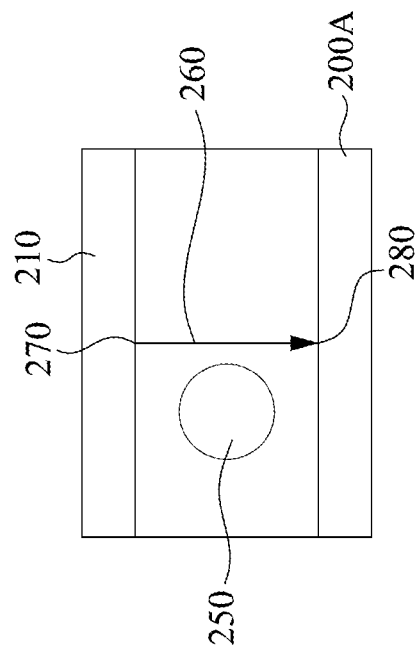
FIG. 2B illustrates a light emitting source emitting light to one sensor in a sensor array opposite of the light emitting source when there is no bubble in the light path in accordance with some embodiments.
Figure 2C:
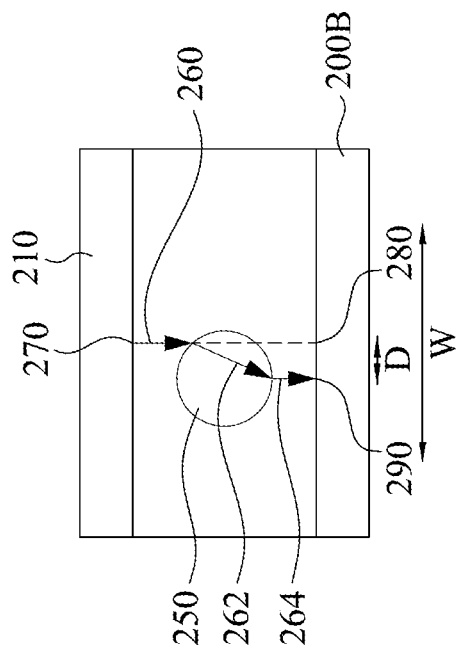
FIG. 2C illustrates a light emitting source emitting light to one sensor in a sensor array opposite of the light emitting source when there is a bubble in the light path in accordance with some embodiments.
Figure 2A:
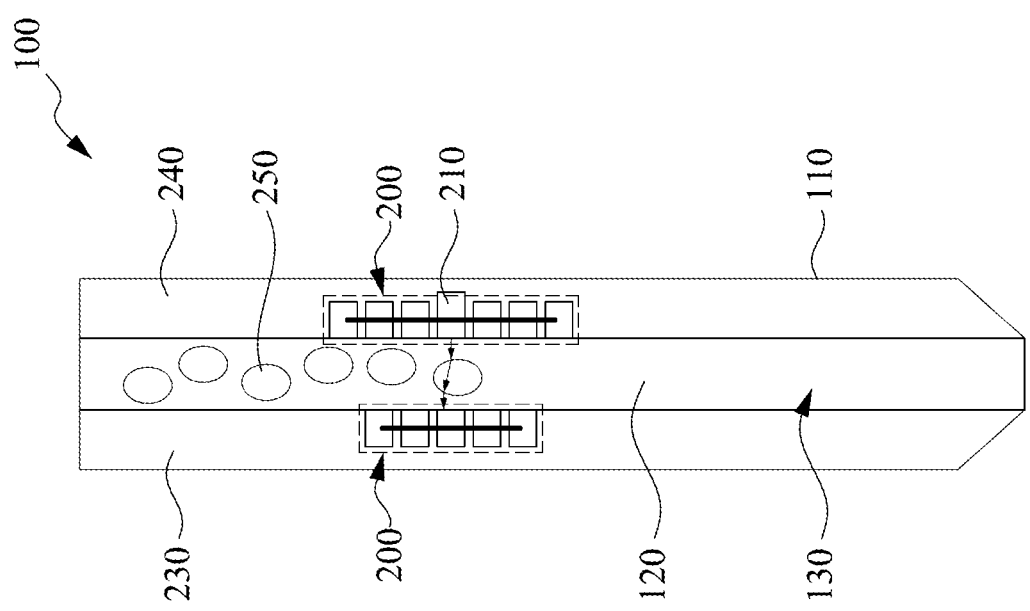
FIG. 2A is a process tube device in accordance with some embodiments.

FIG. 2A is a process tube device in accordance with some embodiments. The process tube device 100 includes one or more sensors (or sensor arrays) 200 and a light emitting source 210. The process tube device 100 includes a first side 230 and a second side 240. The sensor arrays 200 are positioned on both the first side 230 and the second side 240. The sensor arrays 200 on the first side 230 may partially overlap with the sensor arrays 200 on the second side 240. The light emitting source 210 is positioned on the second side 240. As shown in FIG. 2A, in some embodiments, the light emitting source 210 may be arranged in between the sensor arrays 200 positioned on the second side 240 of the process tube device 100. In some embodiments, the light emitting source 210 includes device emitting laser. The wavelength of the laser makes it a beneficial example as a light emitting source 210. However, any other light emitting device capable of emitting light with similar or equal wavelength may be utilized and the embodiments of the present disclosure are not necessarily limited to the use of laser. In some embodiments, the one or more sensors 200 include a variety of types of sensors that are capable of detecting light. For example, the sensors include an ambient light sensor (ALS). However, other types of sensors may be used as appropriate in each embodiment. For example, for embodiments including but not limited to FIG. 3C, FIG. 4A may include a Doppler shift detecting sensor. This will be further detailed below.

A person of ordinary skill in the art would readily understand that the shape of the process tube device 100 is not limited to an I-shaped tubular structure. For example, it can have another tubular structure to form a U-shaped tube or a Y-shaped tube as well as other various shapes by adding another tubular structure on the opposite side. Additionally, in further embodiments, the opposite side of the U-shaped or Y-shaped process tube device 100 may have a different shape and different arrangements of the sensor arrays 200 and the light emitting source 210. That is, both sides of the arm portion do not necessarily have to be identical or substantially similar to each other. Additional embodiments showing different shapes of the arm portion and different arrangements of the sensor arrays 200 and the light emitting source 210 will be detailed in connection FIG. 3A. These different shaped tubular structure (e.g., tubular structures including a non-linear section as shown in FIG. 3A) may be combined to for a U-shaped or a Y-shaped process tube device.

In the fluid 120 flowing along the tube 130, in some cases, there may be one or more bubbles 250 present in the fluid 120. If the fluid 120 including these bubbles 250 are applied on the surfaces of the substrate 140, these bubbles 250 may cause the aforementioned impurity defects. Bubbles are generally empty inside which makes the light reflection and refraction property different from a debris or a particle which are not empty inside. Examples of bubbles include bubbles of gas in the fluid 120. The method of detecting debris or particles will be explained later on.

The method of detecting the presence of bubbles 250 in the tube 130 will be explained in connection with FIG. 2B and FIG. 2C.

FIG. 2B illustrates a light emitting source emitting light to one sensor in a sensor array opposite of the light emitting source when there is no bubble in the light path in accordance with some embodiments. As shown in FIG. 2B, the bubble 250 has not yet reached the section of the process tube device 100 where the light emitting source 210 and the sensor arrays 200 are located. In these situations, light 260 emitted from a first position 270 of the light emitting source 210 is received at a second position 280 in a sensor 200A of the sensor arrays 200. Here, because the bubble 250 is not overlapping with the path of the light 260, the emitted light 260 is directly received without any refraction, reflection, or interference at the sensor 200A. Also, because there is no refraction, reflection or interference, the optical path of the light 260 does not change and the light will arrive at the second position 280 which is exactly opposite or substantially opposite of the location of the first position 270.

FIG. 2C illustrates a light emitting source 210 emitting light to one sensor in a sensor array 200 opposite of the light emitting source when there is a bubble in the light path in accordance with some embodiments. As shown in FIG. 2C, the bubble 250 overlaps with the optical path of the light 260 emitted from the light emitting source 210 to a sensor 200B of the sensor arrays 200. When the light 260 impinges on the interface between the bubble 250 and the fluid, a portion of the light 260 may be reflected and other portions of the light 262 may be refracted (e.g., the optical path of the light may alter and the light may propagate at a different angle). A first refracted light 262 deviates from the original optical path and is propagated within the bubble 250. When the first refracted light 262 is refracted at the boundary between the bubble 250 and the fluid 120, it changes its path and becomes a second refracted light 264 with a changed optical course which causes the second refracted light 264 to impinge on the sensor 200B at a third position 290. When there is a bubble 250 present along the optical path between the light emitting source 210 and the sensor 200B, there is a displacement D between the location where the light would impinge on the sensor 200B when the bubble is not present and the location where the light impinges on the sensor 200B when the bubble is present. In the illustrated embodiment, the displacement D is the distance between the second position 280 and the third position 290. For cases shown in FIG. 2B where no bubble is present, the displacement D would be zero or substantially close to zero. However, in cases shown in FIG. 2C, the displacement D would vary based on how many bubbles the light 260 passes through as well as the size of each of the bubbles that the light 260 passes through. In some embodiments, the sensor 200B may be configured to detect the presence of the bubble 250 based on the displacement D of the optical path of the light. That is, in some embodiments, the detection of the bubbles can be performed without using a sensor adjacently located from the sensor 200B. Further, in some embodiment, a width of the sensor 200B may be narrower compared to the dimension of the bubble 250 or the light emitting source 210. The width of the sensor 200B is depicted as being relatively wider than the bubble merely for illustration purposes. For example, in some cases, the width of the sensor 200B may be narrow enough only to detect any light that is emitted substantially opposite of the light source. Therefore, any bubble that impinges the light path of the light source may be received in a region outside of the sensing area of the sensor 200B. These embodiments will be explained in connection with FIG. 2D.

As briefly explained above, in some embodiments there may be a single detector/sensor and the presence of bubbles in the fluid may be determined based on a change in the location or pixels of the single sensor upon which the light impinges. That is, if there is a displacement D detected within the single sensor, the process tube device 100 may determine there are bubbles in the fluid.

Referring to FIG. 2A, by arranging sensor arrays 200 on the first side 230 of the process tube device 100, the process tube device 100 is capable of detecting the presence of the bubbles 250. In some embodiments, the sensor arrays 200 on the first side 230 may detect the light refracted from the bubbles 250, and the sensor arrays 200 on the second side 240 may detect the light reflected from the bubbles 250. Accordingly, the process tube device 100 is configured to determine whether one or more bubbles 250 are included in the fluid 120 flowing in the tube 130. By detecting the presence of bubbles 250 early on, the process tube device 100 may stop supplying the fluid 120 onto the surfaces of the substrate 140 and remove the portion of the fluid 120 containing the bubbles 250. With this process, the additional step of employing the defect inspection tool can be omitted.

Figure 2D:
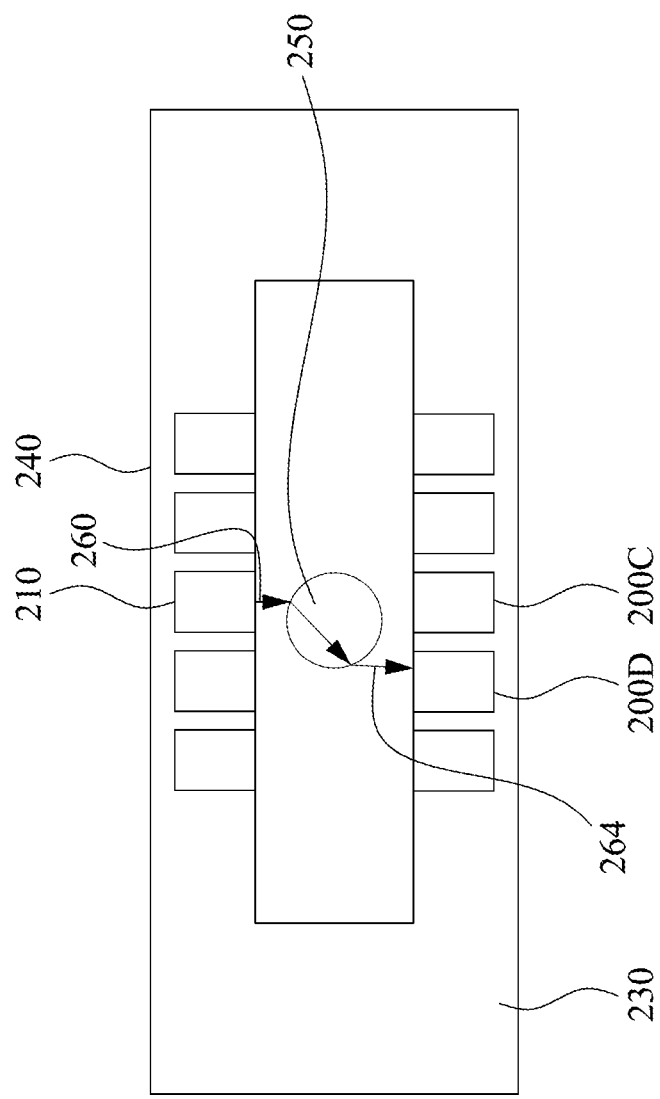
FIG. 2D illustrates one arrangement of sensor arrays in accordance with some embodiments.

FIG. 2D illustrates one arrangement of sensor arrays in accordance with some embodiments. In some embodiments, a light emitting source 210 is arranged opposite of a sensor 200C. If there is no bubble 250 present between the light emitting source 210 and the sensor 200C, the light 260 emitted from the light emitting source 210 is received at the sensor 200C among the sensor arrays 200. However, if there is a bubble 250 present between the light emitting source 210 and the sensor 200C, the light 260 emitted from the light emitting source 210 may be refracted due to the presence of the bubble 250 and the refracted light 264 may be received at another sensor 200D among the sensor arrays 200 that is adjacent to the sensor 200C. Based on the light being received at a different adjacent sensor 200D from the sensor 200C indicates that a bubble 250 is present and the process tube device 100 may determine that there are one or more bubbles 250 inside the fluid 120. While FIG. 2D shows that each of the sensors among the sensor arrays 200 are spaced apart, in other embodiments, all of the sensors may abut each other. In some embodiments, each of the sensors may have their own identifier. For example, a sensor 200C may have a first identifier and a sensor 200D adjacent to the sensor 200C may have a second identifier that is distinguished from the first identifier. The process tube device 100 may determine that if the light 260 is not received by the sensor 200C having the first identifier (and is received by the sensor 200D having the second identifier), there is one or more bubbles 250 in the fluid 120.

Figure 2E:
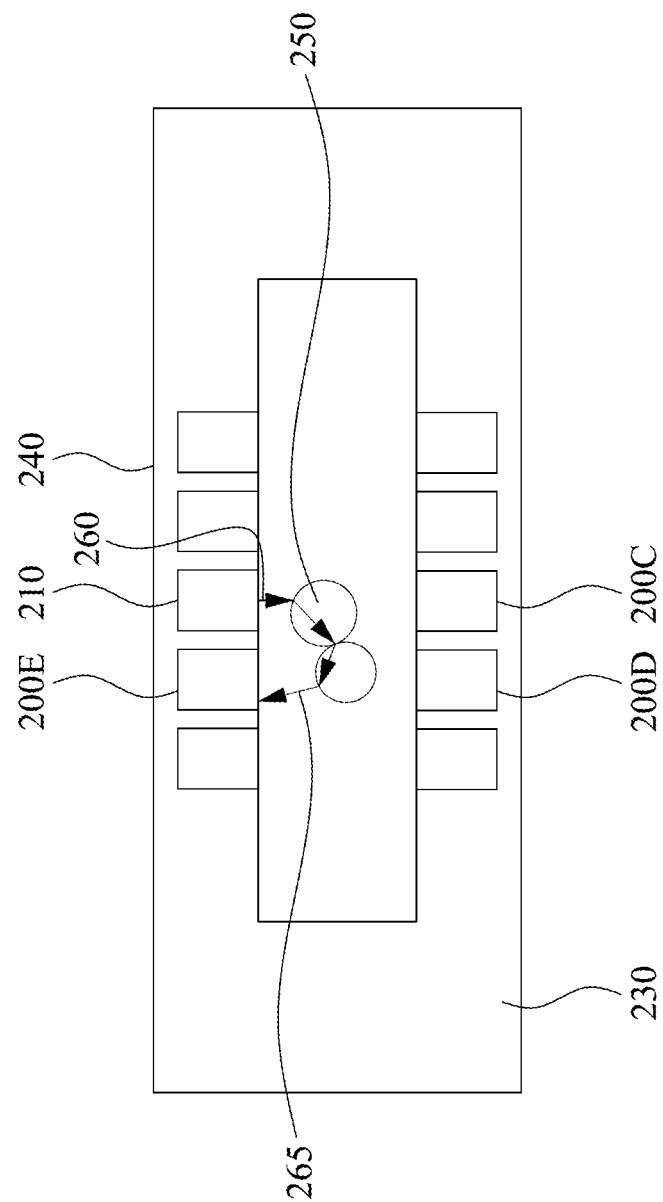
FIG. 2E illustrates one arrangement of sensor arrays in accordance with some embodiments.

FIG. 2E illustrates one arrangement of sensor arrays in accordance with some embodiments. In some embodiments, a light emitting source 210 is arranged opposite of a sensor 200C. If there is no bubble 250 present between the light emitting source 210 and the sensor 200C, the light 260 emitted from the light emitting source 210 is received at the sensor 200C which is one sensor among the sensor arrays 200. However, if there is one or more bubbles 250 (as shown there are two bubbles in FIG. 2E), the light 260 emitted from the light emitting source 210 may be refracted more than one time due to the presence of the bubbles 250. The refracted light 265 may be received at another sensor 200E which is positioned adjacent to the light emitting source 210. Based on the light being received at a sensor 200E different from the sensor 200C, the process tube device 100 may determine that there are one or more bubbles 250 inside the fluid 120. In some cases, some portion of the refracted light may be received at other sensors among the sensor arrays 200. However, if the light emitted from the light emitting source 210 is not received at a particular point in the sensor 200C (e.g., a point exactly opposite of where the light was emitted from the light emitting source 210), the process tube device 100 may determine that there are bubbles 250 present in the fluid within the process tube device 100.

FIG. 3A is a process tube device in accordance with some embodiments. The process tube device 100 includes a sensor 300, a first light emitting source 210A and a second light emitting source 210B. In an arm portion 310 of the process tube device 100, there is a first side 320 and a second side 330. The arm portion 310 includes a non-linear section 340. The non-linear section 340 may have a curved shape section, a V-shaped section, a concave shape section or any other shaped sections. While the process tube device have been illustrated as being a I-shaped process tube device with a non-linear section 340, the various embodiments of the present disclosure is not necessarily limited to this illustration. For example, the process tube device may be combined with another tubular structure to form a Y-shaped dual tubular structure.

In some embodiments, the diameter D1 of the non-linear section 340 of the process tube device 100 is smaller than the diameter D2 of a linear section of the process tube device 100. Because the diameter from the linear section decreases at the non-linear section, based on Bernoulli's principle, the velocity of the fluid flowing in the process tube device 100 increases after passing through the non-linear section. In some embodiments, increasing the fluid velocity inside the tube is beneficial in detecting the presence of the bubbles 250 or any other particles within the fluid as a sensor 300 may require a threshold fluid velocity in order to effectively detect the presence of particles within the fluid. The particular examples of the sensor 300 and the principles of the sensor operates will be detailed in connection with FIG. 3B.

The first light emitting source 210A and the second light emitting source 210B are positioned on the first side 320 of the arm portion 310. The sensor 300 is positioned on the second side 330 of the arm portion 310. In some embodiments, the sensor 300 is positioned at a location on the second side 330 of the arm portion 310 that is directly opposite to a location between the first light emitting source 210A and the second light emitting source 210B on the first side 320 of the arm portion 310. The location of the sensor 300 on the second side 330 may partially overlap with the location of any one of the first and second light emitting sources 210A, 210B positioned on the first side 320. In other embodiments, the location of the sensor 300 on the second side 330 does not partially overlap with any one of the location of the first and second light emitting sources 210A, 210B positioned on the first side 320.

In some embodiments, the first light emitting source 210A and the second light emitting source 210B include devices capable of emitting laser. In some embodiments, the first light emitting source 210A and the second light emitting source 210B may be identical or substantially identical to each other and are arranged at different locations spaced apart from each other on the first side 320. In other embodiments, the first light emitting source 210A and the second light emitting source 210B may be different from each other.

As shown in FIG. 3A, the bubbles 250 may flow in the tube 130 and may disperse into smaller bubbles 350 when colliding with portions of the non-linear section 340 of the arm portion 310. The larger bubbles 250 and the smaller bubbles 350 may be detected by the sensor 300 located downstream and adjacent to the non-linear section 340. The detection method using the principles of Doppler shift will be explained in conjunction with FIGS. 3B and 3C.

Figure 3B:
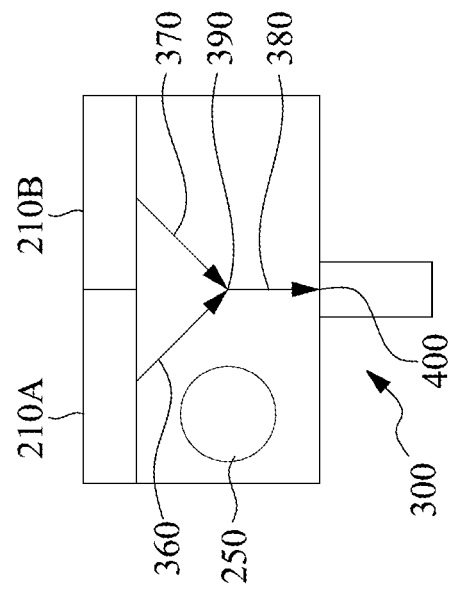
FIG. 3B illustrates a first light emitting source and a second light emitting source emitting light to a sensor opposite of the first and second light emitting sources when there is no bubble in the light path in accordance with some embodiments.

FIG. 3B illustrates a first light emitting source 210A and a second light emitting source 210B emitting light to a sensor 300 opposite of the first and second light emitting sources when there is no bubble in the light path in accordance with some embodiments. As shown in FIG. 3B, a first light 360 is emitted from the first light emitting source 210A and a second light 370 is emitted from the second light emitting source 210B. The light emitted from each of the two different sources at two different locations are used for detecting the fluid speed using a sensor 300 that utilizes the principles of Doppler shift. That is, in these embodiments, the sensor 300 includes a device capable of detecting fluid velocity such as a laser Doppler anemometry (LDA). Laser Doppler anemometry uses the Doppler shift in a laser beam to measure the velocity in transparent or semi-transparent fluid flows. The measurement with LDA is absolute and linear with velocity. The principles of the LDA can be explained as follows. The LDA crosses two beams of collimated, monochromatic, and coherent laser light in the flow of the fluid being measured. These two beams are namely the first light 360 and the second light 370. In other embodiments, the two laser beams may be obtained by splitting a single beam. In some cases, splitting a single beam may ensure coherence between the two laser beams. However, the coherence between the first light 360 and the second light 370 may also be accomplished by using separate light emitting sources, e.g., the first light emitting source 210A and the second light emitting source 210B. In some instances, lasers with wavelengths in the visible spectrum may be used which are typically He—Ne, Argon ion, or laser diode, allowing the laser beam path to be observed. However, for the present disclosure, observing the laser beam path is not necessary. A transmitting optics may be used in the light emitting sources. The transmitting optics focuses the laser beams to intersect at their waists (e.g., the focal point of a laser beam), where they interfere and generate a set of straight fringes. As substances (either naturally occurring or induced) entrained in the fluid pass through the fringes, they reflect light that is then collected by a receiving optics and focused on a photodetector. In some embodiments, the sensor 300 may be included within the receiving optics and the photodetector. The reflected light fluctuates in intensity, the frequency of which is equivalent to the Doppler shift between the incident and scattered light, and is thus proportional to the component of particle velocity which lies in the plane of two laser beams. If the sensor 300 is aligned to the flow such that the fringes are perpendicular to the flow direction, the electrical signal from the photodetector (of the sensor 300) will then be proportional to the full particle velocity. By combining three devices (e.g., He—Ne, Argon ion, and laser diode) with different wavelengths, all three flow velocity components can be simultaneously measured using the LDA.

In FIG. 3B, the bubble 250 has not yet reached the section of the process tube device 100 where the light emitting source 210 and the sensor arrays 200 are located. In these situations, the sensor 300 measures the velocity of the fluid. The process tube device 100 may determine that there is no bubble or any other particle in the fluid when the sensor 300 reads the fluid velocity as being fixed at a certain speed.

Figure 3C:
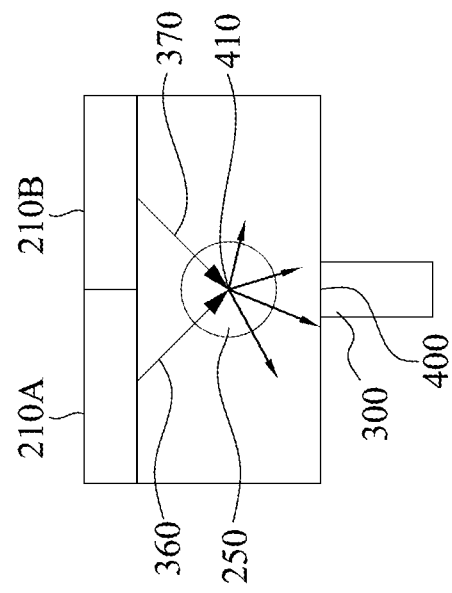
FIG. 3C illustrates a first light emitting source and a second light emitting source emitting light to a sensor opposite of the first and second light emitting sources when there is a bubble in the light path in accordance with some embodiments.
Figure 3A:
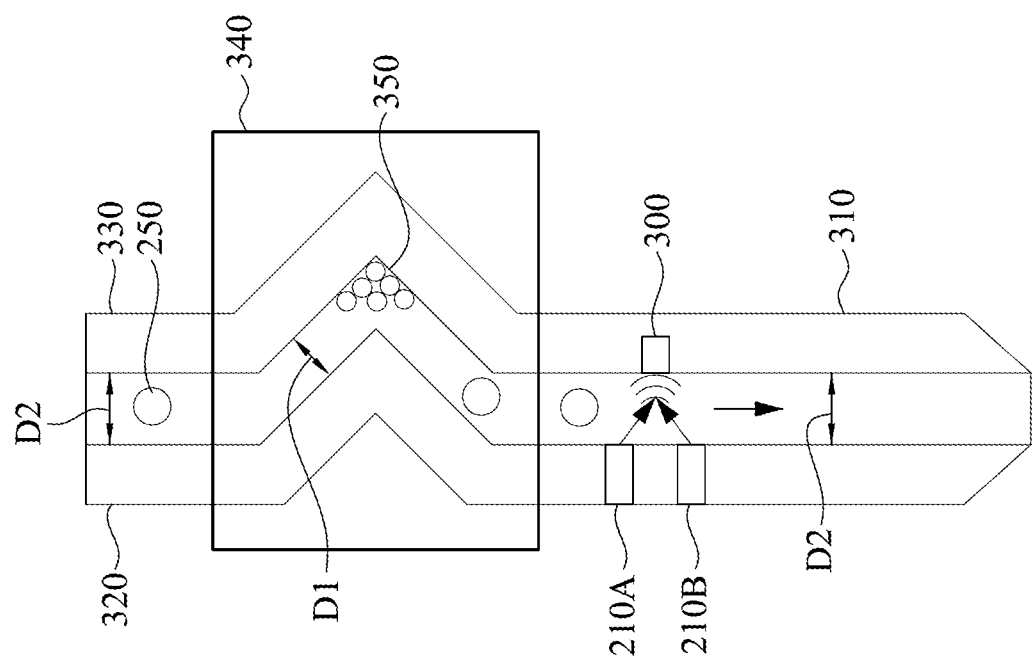
FIG. 3A is a process tube device in accordance with some embodiments.

FIG. 3C illustrates a first light emitting source 210A and a second light emitting source 210B emitting light to a sensor 300 opposite of the first and second light emitting sources when there is a bubble in the light path in accordance with some embodiments. The principle of detecting the speed of fluid by using the first light emitting source 210A and the second light emitting source 210B was explained in connection with FIG. 3B and will not be repeated here. If there is a bubble present, the bubble reflects and disperses the lights to various directions from point 410 and nothing (or a substantially insignificant amount of light) is detected at the location of the sensor 300. The process tube device 100 may determine that there is a bubble (or any other particles) included in the fluid when the sensor 300 is unable to detect the fluid velocity. Although FIG. 3C illustrates the light as not being received at the sensor 300, the scattered light due to the presence of the bubble or any other particles may always exist. However, due to the scattered light, the light signal received at the sensor 300 may be weak to the extent that it may be below a threshold for detection. In some embodiments, the sensor 300 may be configured to have a threshold value and the process tube device may determine that a bubble exists in the light path if the threshold value of the light signal received at the sensor 300 is below the selected threshold value. On the other hand, the process tube device may determine that a bubble is not present in the light path if the amount of light signal received at the sensor 300 is above the selected threshold value.

Figure 4B:
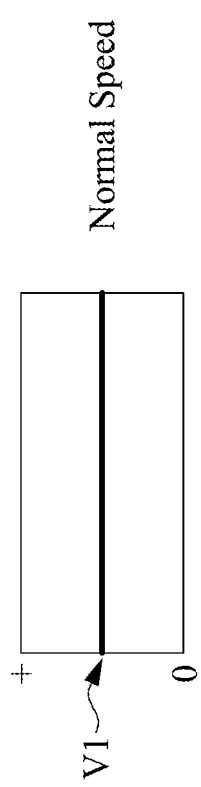
FIG. 4B is a graph showing a fluid velocity when there is no bubble present in the fluid.
Figure 4C:
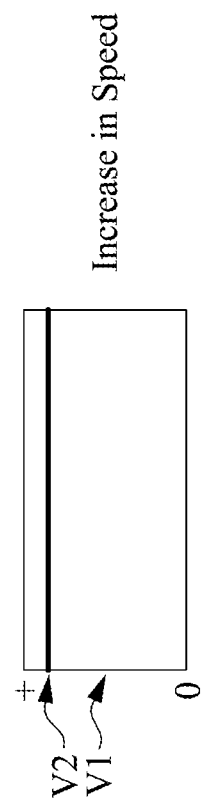
FIG. 4C is a graph showing a change of fluid velocity when a tube includes a non-linear tube section.
Figure 4D:
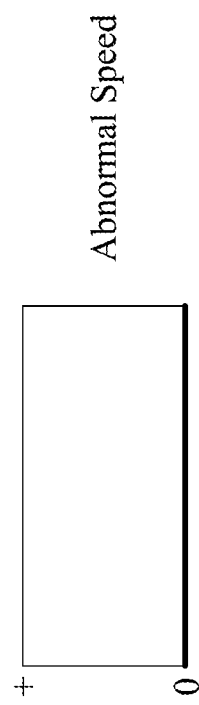
FIG. 4D is a graph showing a fluid velocity when the fluid contains bubbles.
Figure 4A:
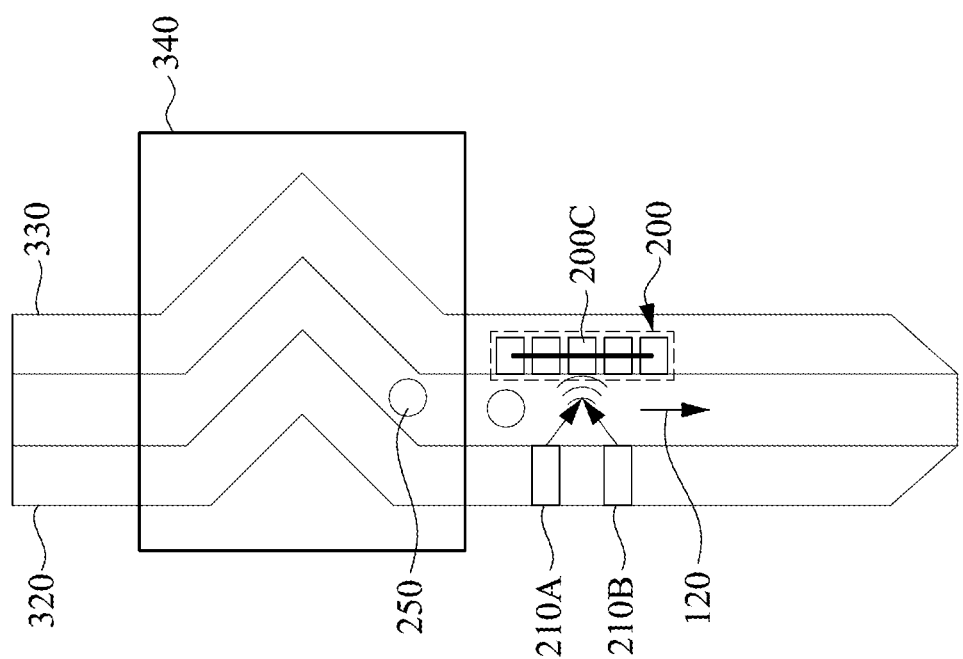
FIG. 4A is an arm portion of a process tube device according to another embodiment.

FIG. 4A is an arm portion of a process tube device according to another embodiment. Comparing it with the embodiments shown in FIG. 3A, the present embodiment has more than one sensor, e.g., an LDA, on a side of the process tube that is opposite to the side on which the light emitting sources 210A and 210B are positioned. The light emitting sources and sensors of this embodiment are similar to the light emitting sources and sensors of the previously described embodiments. Detailed descriptions of the light emitting sources and sensors are omitted here for the sake of brevity. In one embodiment, the fluid velocity is measured at a location adjacent a sensor 200C which is one of the sensors among the sensor arrays 200 located on the second side 330 of the process tube device 100. However, in other embodiments, the fluid velocity may be measured at a location adjacent other sensors adjacent to the sensor 200C.

FIG. 4B is a graph showing a fluid velocity when there is no bubble present in the fluid in a linear process tube device. The x-axis of the graph indicates time and the y-axis of the graph indicates fluid velocity. Generally, when there is no bubble in the fluid 120 and the tube is a linear tube, the fluid velocity as detected by the sensor 200C or sensor arrays 200 is detected as a certain velocity V1 and this velocity V1 is maintained over time, i.e., is constant with time. The process tube device 100 determines, based on the fluid velocity measured using an LDA, that there are no bubbles 250 present inside the fluid 120 when the fluid velocity is maintained constant. With this determination, the process tube device 100 will continue to disperse the fluid 120 onto the surfaces of the substrate 140. FIG. 4B is provided to illustrate that fluid velocity is maintained at velocity V1 for a process tube device that does not include a non-linear section that has a reduced tube diameter.

FIG. 4C is a graph showing a change of fluid velocity when a tube includes a non-linear section 340 (that has a reduced tube diameter compared to that of the linear tube section). When a fluid 120 passes through the non-linear section 340, the velocity of the fluid increases and this increased velocity is detected at the sensor. For example, the fluid velocity may increase from velocity V1 to velocity V2. In one or more embodiments, this velocity V2 is above the threshold velocity. When the fluid velocity increases from velocity V1 to velocity V2, the change of the velocity is detected at the sensor.

FIG. 4D is a graph showing a fluid velocity when the fluid contains bubbles. When there is a bubble present in the fluid 120, the fluid velocity cannot be detected from the sensor 200C or sensors 200. This is at least partially due to the fact that the light signal is scattered which leads to a detection of abnormal fluid velocity or no signal. In some embodiments, the sensor 200C is not capable of detecting the fluid velocity at the sensor 200C due to the dispersed laser beam from the bubbles not reaching the sensors. As explained previously, although there may be some scattered laser beam that reaches the sensor, the intensity or the amount of laser beam signals may be weak and may be below a threshold for detection. The sensor may be configured to detect the speed of fluid when the amount of laser beam signals received is above a threshold value. If that is not the case, the sensor may not be able to determine the speed of the fluid which may result in an abnormal fluid velocity detection or no signal. The incapability of the sensor to detect the fluid velocity is indicative of a presence of an unwanted particle such as a bubble.

In other embodiments, the adjacent sensors from the sensor 200C may be able to detect the velocity of the fluid. However, even in these cases, due to the presence of the bubbles, the detected velocity of the fluid will vary from the velocity of the fluid when bubbles are not present or the detected velocity will not be maintained at a certain velocity. Both of these situations are indicative of a bubble inside the fluid. The process tube device 100 can stop dispersing the fluid 120 onto the surfaces of the substrate 140, based on the output from the sensor so that fluid including bubbles or other particles are not provided on the surfaces of the substrate 140.

Figure 5B:
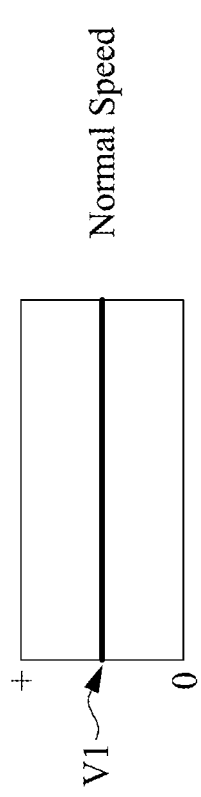
FIG. 5B is a graph showing a fluid velocity when there is no particle present in the fluid.
Figure 5C:
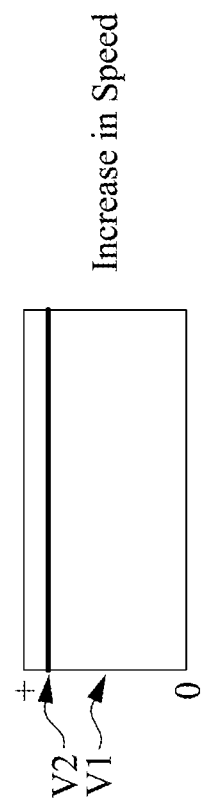
FIG. 5C is a graph showing a change of fluid velocity when a tube includes a non-linear tube section.
Figure 5D:
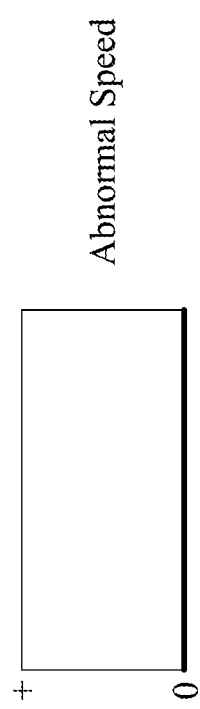
FIG. 5D is a graph showing a fluid velocity when the fluid contains one or more particles.
Figure 5A:
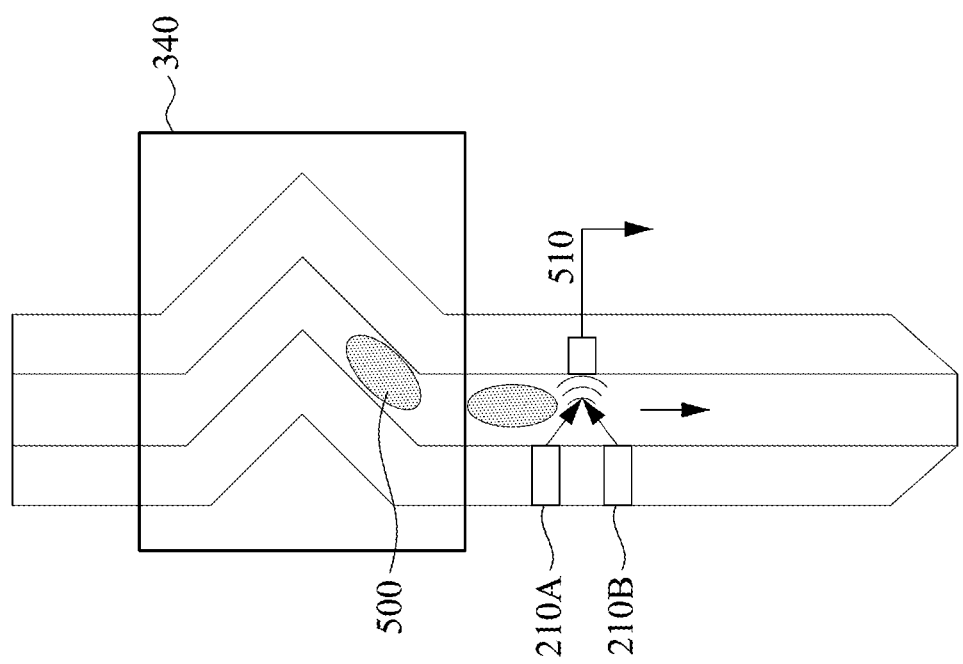
FIG. 5A is an arm portion of a process tube device according to another embodiment.

FIG. 5A is an arm portion of a process tube device according to another embodiment. Comparing it with the embodiments shown in FIG. 4A, the embodiment shown in FIG. 5A has a single sensor positioned on a side of the tube opposite of a side on which the light emitting sources 210A and 210B are located. The light emitting sources and sensors of this embodiment are similar to the light emitting sources and sensors of the previously described embodiments. Detailed descriptions are omitted here for the sake of brevity. Here, the foreign, external material included in the fluid is a particle 500. However, similar to the case with the bubble 250, the changes in the pattern of the fluid velocity caused by the particle 500 will be similar to the changes in the pattern of the fluid velocity caused by the bubble 250. In FIG. 5A, a single sensor 510 is utilized to detect fluid velocity. However, a plurality of sensors may be adjacently arranged to the single sensor 510 similar to the arrangements of the sensors shown in FIG. 4A. This particular embodiment shown in FIG. 5A is to indicate that a single detector 510 may be used to detect the presence of particle or particles 500 in the fluid. The principle of detecting the presence of particle is similar to the principle of detecting the presence of the bubble which is explained in connection with FIGS. 3B and 3C. Accordingly, reiteration of the detecting principle will not be described here. The sensor 510 includes a device capable of detecting fluid velocity. Accordingly, this sensor 510 may be similar to those sensors 300 described in FIGS. 3A, 3B, and 3C. One example of the sensor 510 includes a laser Doppler anemometry which is one type of a Doppler shift detecting sensor.

FIG. 5B is a graph showing a fluid velocity when there is no particle present in the fluid. The x-axis and the y-axis are similar to the graph shown for FIG. 4B. Generally, when there are no particles 500 in the fluid 120 and the tube is a linear tube, the fluid velocity as detected by the sensor 500 is detected as velocity V1 and this velocity is maintained, e.g., is constant over time. FIG. 5B is provided to illustrate that fluid velocity is maintained at velocity V1 for a process tube device that does not include a non-linear section that has a reduced tube diameter.

FIG. 5C is a graph showing a change of fluid velocity when a tube includes a non-linear tube section (that has a reduced tube diameter compared to that of the linear tube section). When a fluid 120 passes through the non-linear section 340, the velocity of the fluid increases from velocity V1 to velocity V2 and this increased velocity is detected at the sensor 510. In one or more embodiments, this velocity V2 is above the threshold velocity for particle detection at the sensor.

FIG. 5D is a graph showing a fluid velocity when the fluid contains one or more particles 500. When there are particles 500 present in the fluid 120, the fluid velocity cannot be detected from the sensor 510 (at least because these particles 500 may cause light diffraction or light scattering in the same way the bubble does). This is at least partially due to the fact that the light signal is scattered which leads to a detection of either an abnormal, irregular fluid velocity or no detected signal at all. If it is determined that there are particles 500 included in the fluid, the process tube device 100 can stop dispersing the fluid 120 onto the surfaces of the substrate 140.

Figure 6:
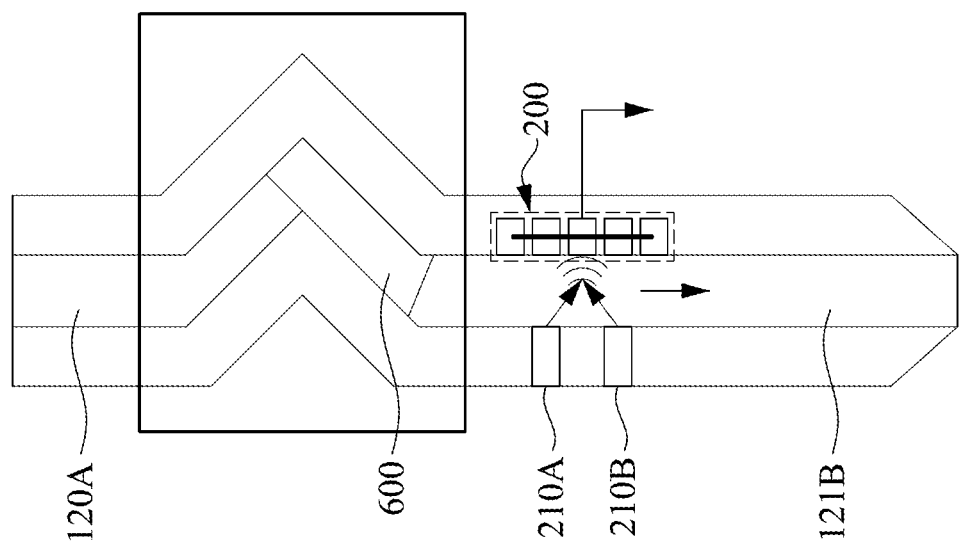
FIG. 6 is an arm portion of a process tube device having a void in the fluid according to another embodiment.

FIG. 6 is an arm portion of a process tube device having a void in the fluid according to another embodiment. Comparing it with the embodiments shown in FIG. 4A, the present embodiment is different in that the fluid 120 contains a void 600. For example, the void 600 may be a combination of a plurality of bubbles combined together to form a larger bubble that fully occupies a section of the process tube. In other words, when a void is present in the fluid within the tube, there is no fluid present in the volume occupied by the void. In some instances, the void 600 may include an air bubble or an air gap that is sufficiently large to separate one part of the fluid 120A from the other part of the fluid 121B. In some embodiments, it may be beneficial to have sensor arrays 200 arranged along the length direction of the tube to detect the void 600 present in the fluid.

Even when a void 600 is present, the sensor 200 (e.g., LDA) is capable of detecting the fluid velocity within the void (which is basically an air gap). However, the velocity of fluid is generally much higher than the velocity of air. Thus, the sensor will still be able to detect the difference in velocity which will be indicative of a void or an air gap.

FIG. 7A is an arm portion of a process tube device according to another embodiment. The embodiment shown in FIG. 7A illustrates a case where a debris or particles 700 are deposited in the non-linear section 340 of the tube. A sensor 700 positioned on a side of the tube opposite of the side where the light emitting sources 210A and 210B are positioned can also detect the presence of deposited particles based on a change in pattern of the fluid velocity. The sensor 700 includes any suitable sensors capable of utilizing the principle of Doppler shift to detect the speed of fluid based on the light emitted from the light emitting sources 210A and 210B. One example of the sensor 700 includes an LDA.

FIG. 7B is a graph showing a change in a pattern of a fluid velocity when there are deposited particles in the tube. The x-axis of the graph indicates time and the y-axis of the graph indicates fluid velocity. Generally, when there are no particles deposited within the tube and there are no external materials including bubbles, void, debris, or the like in the fluid, the fluid velocity would show a pattern similar to that shown in FIG. 4C or FIG. 5C. That is, the fluid velocity after passing through the non-linear section, maintains its fluid velocity at velocity V2. However, if particles 700 accumulate and deposit in the non-linear section 340 over time, the fluid velocity downstream of the deposited particles may drop to a velocity V3 that is lower than the initial velocity V1 and the velocity V2. For example, as the particles 700 are deposited in the non-linear area 340 over time, the velocity which was maintained at V2 in "interval 2" gradually decreases and reaches velocity V3 in "interval 3." The change in fluid velocity from "interval 2" to "interval 3" illustrates the process of the particles 700 starting to deposit and reaching a maximum deposit amount. When the particles 700 can no longer be deposited, the fluid velocity maintains its velocity V3 in "interval 3." If the deposited particles 700 are partially flushed out due to the downstream flow of the fluid 120, then the fluid velocity as detected at sensor 700 will gradually increase from velocity V3 to a velocity that is greater than V3 but smaller than V2. If the deposited particles 700 are entirely flushed out due to the downstream flow of the fluid 120, then the fluid velocity as detected at sensor 700 will gradually increase from velocity V3 and reach velocity V2. A person of ordinary skill in the art would readily understand that when the deposited particles 700 are partially or entirely flushed out due to the downstream flow of the fluid 120, there will be an interval where no fluid velocity is detected due to the laser beam being scattered due to the presence of the particles passing between the light emitting sources 210A, 210B and the sensor 700 (which will be similar to the fluid velocity graphs shown in FIG. 4D and FIG. 5D).

Figure 8:
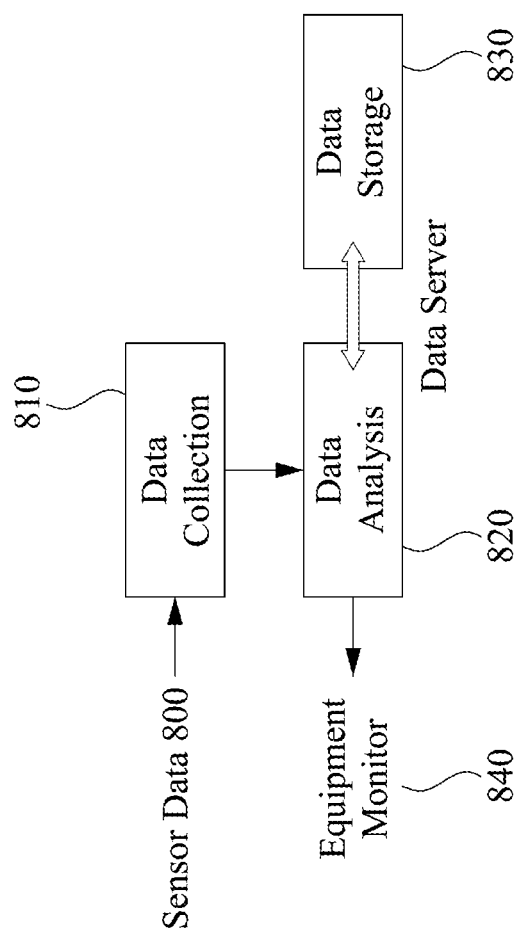
FIG. 8 is a schematic diagram showing a data process flow after various parameters are collected from the sensor array in accordance with some embodiments.

FIG. 8 is a schematic diagram showing a data process flow after various parameters are collected from the sensor array in accordance with some embodiments.

Sensor data 800 collected from the various sensors discussed in the embodiments are provided to a data collection circuit 810. The sensors may detect various parameters and measurements in the process for detecting external materials in the fluid. Some non-limiting examples of the various parameters and measurements include coordinate information indicative of where the laser beam was received at which sensor (for example, laser beam could be received at a second sensor that is located adjacent to the first sensor that is substantially opposite of the location where the laser beam was emitted) or at which pixel location of a sensor (for example, laser beam could be received at the first sensor that is substantially opposite of the location where the laser beam was emitted but at a different pixel location compared to the exact opposite pixel if the laser beam propagated linearly throughout its optical path), level of intensity of light received at the sensor, velocity information including the velocity of the fluid, the shape of the tube in which the fluid flows, the size and dimension of the tube in which the fluid flows, the degree of reflection or refraction based on the type of external materials (for bubbles, refraction occurs more than reflection; for debris or particles, light may not penetrate at all and there may be substantially minimum refraction or reflection), the type of fluid used in a certain semiconductor process, they properties of fluid used in a certain semiconductor process (e.g., viscosity), the type of wafers that are being processed (e.g., for different process, different types of wafers may be used), the dimension and size of wafers, the age or life time of the various parts of the tube, and other historical measurement data obtained during the process may be included.

In some embodiments, the data collection circuitry 810 includes a memory. The memory may include Random Access Memory (RAM) and Read Only Memory (ROM). The data collection circuitry 810 may include other storage devices, which may be a hard disk drive or a removable storage drive such as an optical disk drive, solid state disk drive (e.g., flash RAM), and the like.

The sensor data 800 stored in the data collection 810 may be retrieved by a data analysis circuitry 820. The data analysis circuitry 820 may further analyze the various parameters and measurements to determine the presence of external materials in the fluid. The data analysis circuitry 820 may be implemented by processing circuitry such as a microprocessor, microcontroller, integrated circuit, chip, microchip or the like. In some embodiments, the data analysis circuitry 820 includes a controller. The controller includes any electrical circuitry, features, components, an assembly of electronic components to analyze the various parameters and measurements to determine the presence of external materials in the fluid. Further example of the controller includes any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of determine the presence of external materials in the fluid.

In one or more embodiments, the controller is operatively coupled to sensors discussed in FIG. 2A through FIG. 7A. The controller is configured to perform the functions of determining whether external materials are present in the fluid as discussed in the embodiments of FIG. 2A through FIG. 7A.

In some embodiments, the analyzed data using the controller of the data analysis circuit 820 may be further stored in a data storage 830. The data storage 830 may be non-local memory that may use cloud-based technology. In other embodiments, the data storage 830 may be a storage included in a data server. In these embodiments, part of the processing resources may be assigned to the data server so that the processing is not entirely performed at the controller. After the data is analyzed based on the various measurements and different parameters, the data may be provided to an equipment monitor 840 that can visually display the data to a user in user-friendly manner. For example, the equipment monitor 840 may include a monitor with a display, or a display device, or any other processing circuitry with a display panel.

Embodiments of the present disclosure provide several advantages. For example, in some embodiments, the process tube device can detect the presence of any foreign, external material that may reside within a fluid flowing within the tube. In some embodiments, the process tube device detects the external materials in-situ which obviates the need for a separate inspection device to inspect the surface of a wafer after applying fluid on the surface. The process tube device utilizes at least two methods of detecting the presence of external materials. The first method is the direct measurement method in which a light detecting sensor such as an ambient light sensor is used. By using this sensor, the detection of the external material is determined based on whether the light or the laser beam emitted from a light emitting source is received at the light detecting sensor which is positioned on a side of the conduit carrying the fluid that is opposite to the side of the conduit where the light source is positioned. Presence of external materials between the light emitting source and the light detecting sensor obstructs the laser beam from propagating in a substantially linear manner to the light detecting sensor. The process tube device determines that an external material is present in the fluid by receiving information from the light detecting sensor that the laser beam was either reflected or refracted by the external material and received at a different location of the light detecting sensor (e.g., location other than a location that is directly opposite from the light emitting source). The second method is an indirect measurement method in which a different type of sensor is used. For example, a Doppler shift sensor that uses the principles of Doppler shift to determine the speed of fluid based on the laser beam can be used. By using this Doppler shift sensor, the detection of the external material is performed by measuring the velocity of the fluid flowing in the tube. Using these methods to detect the present of the external materials within the fluid in advance obviates the need to rely on a separate after-inspection process that is conducted after the fluid is provided on the surface of the substrate for processing in order to detect harmful effects of the external materials in the fluid. The process tube device according to the present disclosure increases production yields and reliability by providing early detection of potentially harmful external materials in fluids to be applied to substrates. The process tube device improves profitability by reducing the number of off spec substrates that are produced due to the presence of harmful materials in fluids that are applied to the substrates and by obviating the need for post-production inspection of the substrates to assess whether harmful materials in the fluids have resulted in off spec substrates.

One or more embodiments of the present disclosure provides a process tube device. The process tube device includes a nozzle configured to receive fluid. However, this is one embodiment of the process tube device, and the nozzle component may be omitted. The process tube device includes a main tube coupled to the nozzle. Here, the main tube provides a channel for the fluid.

The process tube device includes a first tube extending from the main tube. Here, the first tube may have a first side and a second side opposite of the first side.

The process tube device also includes a light emitting source positioned on the first side of the first tube. The light emitting source is configured to emit light along a first optical path.

The process tube device also includes a first sensor positioned on the second side of the first tube opposite of the light emitting source. The first sensor is configured to receive the light emitted by the light emitting source along the first optical path. Here, the first optical path is substantially linear from the light emitting source to the first sensor.

The process tube device further includes a second sensor positioned on the second side of the first tube and adjacent to the first sensor. In some embodiments, the first sensor and the second sensor may include ambient light sensors capable of detecting the presence of light. The first and second sensors may be further configured to detect the location where the light was received (for example, the sensors may output a coordinate information that shows which pixel received the light, a laser beam, among the plurality of pixels included in the sensors).

In some embodiments, the process tube device includes a controller operatively coupled to the first and second sensors. The controller is configured to receive data from the first and second sensors. Here, the first and second sensors receive signals based on the light from the light emitting source.

In some embodiments, the controller may be located outside of the process tube device. That is, the controller may be operatively coupled to the process tube device to communicate and exchange control signals and response signals. However, in other embodiments, the controller may be located within the process tube device and communicate and exchange control signals and response signals with each other.

In one or more embodiments, the controller is configured to determine at least one external material is present in fluid within the first tube in response to light emitted from the light emitting source being refracted from the at least one external material, propagated along a second optical path and received at the second sensor. Here, the second optical path may be different from the first optical path. For example, the first optical path may be a substantially linear path from the light emitting source to the first sensor. The second optical path on the other hand, may be an optical path that has one or more sections that are not linear. For example, the second optical path includes the path of both refracted and reflected light.

In one or more embodiments, the controller is further configured to determine no external material is present in the fluid passing between the light emitting source and the first sensor in response to the first sensor receiving the light along the first optical path.

Further aspects of the present disclosure includes a fluid inspecting system for inspecting flowing fluid for foreign external materials. The fluid inspecting system includes a process tube device and a controller.

In some embodiments, the process tube device includes a main tube coupled to a nozzle, a first tube extending from the main tube. Here, the first tube has a first side and a second side opposite of the first side, and the first tube includes a linear section and a non-linear section adjacent to the linear section.

The process tube device may further include a first light emitting source on the first side of the first tube, a second light emitting source on the first side of the first tube and adjacent to the first light emitting source.

In some embodiments, the process tube device also includes a Doppler shift sensor on the second side of the first tube. Here, the Doppler shift sensor is positioned opposite of a location between the first and second light emitting sources. However, the location of arranging the Doppler shift sensor is merely to improve the accuracy of the output of the Doppler shift sensor. Accordingly, in other embodiments, the location where the Doppler shift sensor is arranged may be changed and does not have to be necessarily arranged between the first and second light emitting sources.

In some embodiments, the Doppler shift sensor includes a sensor that is capable of utilizing the principles of Doppler shift to output a velocity data of the fluid. One non-limiting example of a Doppler shift sensor includes a laser Doppler anemometry.

The controller is operatively coupled to the process tube device and configured to receive velocity data from the Doppler shift sensor. The Doppler shift sensor receives the velocity data based on the light from the first and second light emitting sources.

In one or more embodiments, the controller is further configured to determine at least one external material is present in fluid within the first tube in response to the Doppler shift sensor detecting no velocity for the fluid passing between the first and second light emitting sources and the Doppler shift sensor.

The controller may be further configured to determine no external material is present in the fluid passing between the first and second light emitting sources and the Doppler shift sensor in response to a velocity of the fluid maintaining a substantially constant velocity.

Further embodiments of the present disclosure provides a method of detecting external materials inside a fluid flowing within a tube. The method includes emitting a laser beam into the fluid from a light emitting source on a first side of the tube. The method includes passing the laser beam through the fluid along a first optical path. Here, the first optical path may be a substantially straight path.

The method further includes receiving the laser beam at a first sensor on a second side of the tube opposing the light emitting source and receiving a refracted portion of the laser beam at a second sensor positioned on the second side of the tube and adjacent to the first sensor. Here, the refracted portion of the laser beam propagates along a second optical path different from the first optical path.

The method includes determining at least one external material is present in the fluid in response to the second sensor receiving the refracted portion of the laser beam. The method also includes determining no external material is present in the fluid passing between the light emitting source and the first sensor in response to the first sensor receiving the light along the first optical path.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A process tube device, comprising:
   a nozzle configured to receive fluid;
   a main tube coupled to the nozzle, the main tube providing a channel for the fluid;
   a first tube extending from the main tube, the first tube having a first side and a second side opposite of the first side;
   a first sensor array containing a first sensor, a second sensor, and a third sensor positioned on and adjacent to the second side of the first tube, the first sensor further positioned between the second sensor and the third sensor;
   a second sensor array containing a fourth sensor positioned on the first side of the first tube and adjacent to a light emitting source;
   a third sensor array containing a fifth sensor positioned on the first side of the first tube and adjacent to the light emitting source;
   wherein the light emitting source is positioned on the first side of the first tube between the second sensor array and the third sensor array and linearly opposite to the first sensor, the light emitting source configured to emit light to the channel along a first optical path, wherein the first optical path is linear between the light emitting source and the first sensor; and
   a controller operatively coupled to the first, second, third, fourth, and fifth sensors and configured to receive data from the first, second, third, fourth, and fifth sensors, wherein the first, second, third, fourth, and fifth sensors receive signals based on the light from the light emitting source,
   wherein the controller is further configured to:
   determine at least one external material is present in fluid within the first tube in response to light emitted from the light emitting source being refracted from the at least one external material, propagated along a second optical path and received at the second sensor, the third sensor, or both the second and third sensors, wherein the second optical path is different from the first optical path; and
   determine no external material is present in the fluid passing between the light emitting source and the first sensor in response to the first sensor receiving the light along the first optical path.

2. The process tube device of claim 1,
   wherein the controller is further configured to:
   determine at least one external material is present in the fluid in response to light emitted from the light emitting source being reflected from the at least one external material, propagated along a second optical path and received at the fourth sensor, the fifth sensor, or both the fourth and fifth sensors.

3. The process tube device of claim 1, wherein the light emitting source includes a laser beam.

4. The process tube device of claim 1, further comprising a second tube extended from the main tube, the second tube adjacent to the first tube and having a first side and a second side opposite of the first side, wherein the second tube includes a linear section and a non-linear section adjacent to the linear section.

5. The process tube device of claim 4, wherein the linear section includes a substantially straight tube throughout the linear section and the non-linear section includes at least one of a V-shaped tube or an L-shaped tube or a U-shaped tube.

6. The process tube device of claim 5, wherein the linear section of the second tube is located between the non-linear section and the main tube.

7. The process tube device of claim 4, further comprising:
   a first light emitting source on the first side of the second tube;
   a second light emitting source on the first side of the second tube and adjacent to the first light emitting source; and
   a Doppler shift sensor on the second side of the second tube, the Doppler shift sensor positioned opposite of a location between the first and second light emitting sources.

8. The process tube device of claim 7, wherein the first and second light emitting sources include a laser beam, wherein the Doppler shift sensor includes a laser Doppler anemometry configured to use Doppler shift in a laser beam to measure a velocity in fluid flows.

9. The process tube device of claim 7, wherein the controller is operatively coupled to the Doppler shift sensor and configured to receive velocity data from the Doppler shift sensor, wherein the Doppler shift sensor generates the velocity data based on the light from the first and second light emitting sources, wherein the controller is further configured to:
determine at least one external material is present in fluid in the second tube in response to the Doppler shift sensor outputting no velocity reading for the fluid in the second tube passing between the first and second light emitting sources and the Doppler shift sensor; and
determine no external material is present in the fluid in the second tube passing between the first and second light emitting sources and the Doppler shift sensor in response to a velocity of the fluid in the second tube maintaining a substantially constant velocity.

10. A fluid inspecting system for inspecting flowing fluid, comprising:
a process tube device, including:
a nozzle configured to receive fluid;
a main tube coupled to the nozzle, the main tube providing a channel for the fluid;
a first tube extending from the main tube, the first tube having a first side and a second side opposite of the first side;
a light emitting source positioned on and adjacent to the first side of the first tube, the light emitting source configured to emit light to the channel along a first optical path;
a first sensor positioned on and adjacent to the second side of the first tube, the first sensor further positioned opposite the light emitting source and configured to receive the light emitted by the light emitting source along the first optical path, wherein the first optical path is configured to be linear between the first sensor and the light emitting source;
a second sensor positioned on and adjacent to the second side of the first tube and adjacent to the first sensor;
a third sensor and fourth sensor positioned on the first side of the first tube, the light emitting source positioned between the third sensor and the fourth sensor; and
a controller operatively coupled to the first, second, third, and fourth sensors and configured to receive data from the first, second, third, and fourth sensors, wherein the first, second, third, and fourth sensors receive signals based on the light from the light emitting source,
wherein the controller is further configured to:
determine at least one external material is present in fluid within the first tube in response to light emitted from the light emitting source being refracted from the at least one external material, propagated along a second optical path and received at the second sensor, wherein the second optical path is different from the first optical path; and
determine no external material is present in the fluid passing between the light emitting source and the first sensor in response to the first sensor receiving the light along the first optical path.

11. The fluid inspecting system of claim 10, wherein the controller is further configured to:
determine at least one external material is present in the fluid in response to light emitted from the light emitting source being reflected from the at least one external material, propagated along a second optical path and received at the third sensor, the fourth sensor, or both the third and fourth sensors.

12. The fluid inspecting system of claim 10, further comprising
a second tube extended from the main tube, the second tube adjacent to the first tube and having a first side and a second side opposite of the first side, wherein the second tube includes a linear section and a non-linear section adjacent to the linear section.

13. The fluid inspecting system of claim 12, wherein the linear section includes a substantially straight tube throughout the linear section and the non-linear section includes at least one of a V-shaped tube or an L-shaped tube or a U-shaped tube, and
wherein the linear section of the second tube is located between the non-linear section and the main tube.

14. A fluid inspecting system for inspecting flowing fluid, comprising:
a process tube device, including:
a main tube coupled to a nozzle configured to receive fluid, the main tube providing a channel for the fluid;
a first tube extending from the main tube, the first tube having a first side and a second side opposite of the first side;
a light emitting source positioned on and adjacent to the first side of the first tube, the light emitting source configured to emit light to the channel along a first optical path;
a first sensor array positioned on and adjacent to the second side of the first tube, the first sensor array further positioned opposite the light emitting source and configured to receive the light emitted by the light emitting source along the first optical path, wherein the first optical path is configured to be linear between the first sensor array and the light emitting source;
a second sensor array positioned on and adjacent to the second side of the first tube and adjacent to the first sensor array;
a third sensor array positioned on the first side of the first tube, the light emitting source adjacent to the third sensor array;
a fourth sensor array positioned on the first side of the first tube, the light emitting source adjacent to the fourth sensor array, the fourth sensor array positioned opposite of the third sensor array relative to the light emitting source; and
a controller operatively and communicatively coupled to the process tube device including the first, second, third, and fourth sensor arrays, the controller configured to receive data from the first, second, third, and fourth sensor arrays, wherein the first, second, third, and fourth sensor arrays receive signals based on the light from the light emitting source,
wherein the controller is further configured to:
determine at least one external material is present in fluid within the first tube in response to light emitted from the light emitting source being refracted from the at least one external material, propagated along a second optical path and received at the second sensor array; and
determine no external material is present in the fluid passing between the light emitting source and the first sensor array in response to the first sensor array receiving the light along the first optical path.

15. The fluid inspecting system of claim 14, wherein the first optical path and the second optical path are different from each other.

16. The fluid inspecting system of claim 14, further comprising
a second tube extended from the main tube, the second tube adjacent to the first tube and having a first side and a second side opposite of the first side, wherein the second tube includes a linear section and a non-linear section adjacent to the linear section.

17. The fluid inspecting system of claim 16, wherein the linear section includes a substantially straight tube throughout the linear section and the non-linear section includes at least one of a V-shaped tube or an L-shaped tube or a U-shaped tube, and
wherein the linear section of the second tube is located between the non-linear section and the main tube.

18. The fluid inspecting system of claim 14, further comprising:
a first light emitting source on the first side of the second tube;
a second light emitting source on the first side of the second tube and adjacent to the first light emitting source; and
a Doppler shift sensor on the second side of the second tube, the Doppler shift sensor positioned opposite of a location between the first and second light emitting sources.

19. The fluid inspecting system of claim 18, wherein the first and second light emitting sources include a laser beam, wherein the Doppler shift sensor includes a laser Doppler anemometry configured to use Doppler shift in a laser beam to measure a velocity in fluid flows.

20. The fluid inspecting system of claim 18, wherein the controller is operatively coupled to the Doppler shift sensor and configured to receive velocity data from the Doppler shift sensor, wherein the Doppler shift sensor generates the velocity data based on the light from the first and second light emitting sources,
wherein the controller is further configured to:
determine at least one external material is present in fluid in the second tube in response to the Doppler shift sensor outputting no velocity reading for the fluid in the second tube passing between the first and second light emitting sources and the Doppler shift sensor; and
determine no external material is present in the fluid in the second tube passing between the first and second light emitting sources and the Doppler shift sensor in response to a velocity of the fluid in the second tube maintaining a substantially constant velocity.

* * * * *